United States Patent
Fernando et al.

(10) Patent No.: US 11,907,853 B2
(45) Date of Patent: Feb. 20, 2024

(54) USING HIERARCHICAL REPRESENTATIONS FOR NEURAL NETWORK ARCHITECTURE SEARCHING

(71) Applicant: DeepMind Technologies Limited, London (GB)

(72) Inventors: Chrisantha Thomas Fernando, London (GB); Karen Simonyan, London (GB); Koray Kavukcuoglu, London (GB); Hanxiao Liu, Santa Clara, CA (US); Oriol Vinyals, London (GB)

(73) Assignee: DeepMind Technologies Limited, London (GB)

( * ) Notice: Subject to any disclaimer, the term of this patent is extended or adjusted under 35 U.S.C. 154(b) by 437 days.

(21) Appl. No.: 16/759,567

(22) PCT Filed: Oct. 26, 2018

(86) PCT No.: PCT/EP2018/079401
§ 371 (c)(1),
(2) Date: Apr. 27, 2020

(87) PCT Pub. No.: WO2019/081705
PCT Pub. Date: May 2, 2019

(65) Prior Publication Data
US 2020/0293899 A1 Sep. 17, 2020

Related U.S. Application Data

(60) Provisional application No. 62/578,356, filed on Oct. 27, 2017.

(51) Int. Cl.
*G06N 3/086* (2023.01)
*G06N 3/045* (2023.01)
(Continued)

(52) U.S. Cl.
CPC .......... *G06N 3/086* (2013.01); *G06F 16/9024* (2019.01); *G06N 3/045* (2023.01); *G06F 17/15* (2013.01)

(58) Field of Classification Search
CPC .. G06N 3/086; G06N 3/0454; G06F 16/9024; G06F 17/15
See application file for complete search history.

(56) References Cited

U.S. PATENT DOCUMENTS 10,521,729 B2 * 12/2019 Vasudevan ............. G06N 3/045

FOREIGN PATENT DOCUMENTS

| CN | 105719001 | 6/2016 |
| CN | 106471526 | 3/2017 |

OTHER PUBLICATIONS

Real, Esteban, et al. "Large-scale evolution of image classifiers." International conference on machine learning. PMLR, (Year: 2017).*
(Continued)

*Primary Examiner* — Michael J Huntley
*Assistant Examiner* — Adam C Standke
(74) *Attorney, Agent, or Firm* — Fish & Richardson P.C.

(57) ABSTRACT

A computer-implemented method for automatically determining a neural network architecture represents a neural network architecture as a data structure defining a hierarchical set of directed acyclic graphs in multiple levels. Each graph has an input, an output, and a plurality of nodes between the input and the output. At each level, a corresponding set of the nodes are connected pairwise by directed edges which indicate operations performed on outputs of one node to generate an input to another node. Each level is associated with a corresponding set of operations. At a lowest level, the operations associated with each edge are selected from a set of primitive operations. The method includes repeatedly generating new sample neural network
(Continued)

$1 \times 1\ conv$ $\qquad$ $3 \times 3\ conv$ $\qquad$ $3 \times 3\ max-pooling$ $\sigma_1^{(1)}$ $\qquad\qquad$ $\sigma_2^{(1)}$ $\qquad\qquad$ $\sigma_3^{(1)}$ architectures, and evaluating their fitness. The modification is performed by selecting a level, selecting two nodes at that level, and modifying, removing or adding an edge between those nodes according to operations associated with lower levels of the hierarchy.

19 Claims, 4 Drawing Sheets

(51) Int. Cl.
*G06F 17/15* (2006.01)
*G06F 16/901* (2019.01)

(56) References Cited

OTHER PUBLICATIONS

Suganuma, Masanori, et al. "A genetic programming approach to designing convolutional neural network architectures." Proceedings of the genetic and evolutionary computation conference (Year: 2017).*
Baker et al., "Designing neural network architectures using reinforcement learning," CoRR, 2016, https://arxiv.org/abs/1611.02167, 18 pages.
Brock et al., "Smash: One-shot model architecture search through hypernetworks," CoRR, 2017, https://arxiv.org/abs/1708.05344, 21 pages.
Chollet et al., "Xception: Deep learning with depthwise separable convolutions," CoRR, 2016, arXivpreprintarXiv:1610.02357, 8 pages.
Desell et al., "Large scale evolution of convolutional neural networks using volunteer computing," CoRR, 2017, arXiv:1703.05422v1, 17 pages.
Floreano et al., "Neuroevolution: from architectures to learning," Evolutionary Intelligence, 2008, 1(1):47-62.
Goldberg et al., "A comparative analysis of selection schemes used in genetic algorithms," Foundations of genetic algorithms, 1991, 1:69-93.
Gruau et al., "Neural network synthesis using cellular encoding and the genetic algorithm," Thesis for the degree of Doctor of Computer Science, Universite Claude Bernard-Lyon, Jan. 4, 1994, 159 pages.
He et al., "Deep residual learning for image recognition," Proceedings of the IEEE conference on computer vision and pattern recognition, 2016, pp. 770-778.
He et al., "Identity mappings in deep residual networks," ECCV 2016: Computer Vision, 2016, pp. 630-645.
Kitano, "Designing neural networks using genetic algorithms with graph generation system," Complex systems, 1990, 4(4):461-476.
Huang et al., "Densely connected convolutional networks," CoRR, 2016, arXivpreprintarXiv: 1608.06993, 9 pages.
Ioffe et al. "Batch normalization: Accelerating deep network training by reducing internal covariate shift," CoRR, 2015, https://arxiv.org/abs/1502.03167, 11 pages.
Larsson et al., "Fractalnet: Ultra-deep neural networks without residuals," CoRR, 2016, arXivpreprint arXiv:1605.07648, 11 pages.
Miikkulainen et al., "Evolving deep neural networks," CoRR, 2017, arXivpreprintarXiv:1703.00548, 8 pages.
Miller et al., "Designing neural networks using genetic algorithms," ICGA, 1989, 89:379-384.
Negrinho et al., "Deeparchitect: Automatically designing and training deep architectures," CoRR, 2017, arXivpreprintarXiv:1704.08792, 12 pages.
PCT International Preliminary Report on Patentability in International Appln. PCT/EP2018/079401, dated May 7, 2020, 8 pages.
PCT International Search Report and Written Opinion in International Appln. No. PCT/EP2018/079401, dated Feb. 15, 2019, 14 pages.
Real et al., "Large-scale evolution of image classifiers," CoRR, 2017, arxivpreprintarXiv:1703.01041, 18 pages.
Real et al., "Regularized evolution for image classifier architecture search," CoRR, 2018, arXivpreprintarXiv:1802.01548, 10 pages.
Russakovsky et al., "Imagenet large scale visual recognition challenge. International Journal of Computer Vision," Int J Comput Vis., 2015, 115(3):211-252.
Shafiee et al., "Learning efficient 1-19 deep feature representations via transgenerational genetic transmission of environmental information during evolutionary synthesis of deep neural networks," 2017 IEEE International Conference on Computer Vision Workshops, Oct. 22, 2017, pp. 979-986.
Simonyan et al., "Very deep convolutional networks for large-scale image recognition," CoRR, 2014, arXivpreprintarXiv:1409.1556, 14 pages.
Stanley et al., "A hypercube-based encoding for evolving large-scale neural networks," Artificial life, 2009, 15(2):185-212.
Stanley et al., "Compositional pattern producing networks: A novel abstraction of development," Genetic programming and evolvable machines, 2007, 8(2):131-162.
Stanley et al., "Evolving neural networks through augmenting topologies," Evolutionary computation, 2002, 10(2):99-127.
Suganuma et al., "A genetic programming approach to designing convolutional neural network architectures," CoRR, 2017, arXiv:1704.00764v2, 9 pages.
Szegedy et al., "Going deeper with convolutions," CoRR, 2015, https://arxiv.org/abs/1409.4842, 12 pages.
Szegedy et al., "Inception-v4, inception-resnet and the impact of residual connections on learning," Thirty-First AAAI Conference on Artificial Intelligence, 2017, pp. 4278-4284.
Szegedy et al., "Rethinking the inception architecture for computer vision," Proceedings of the IEEE Conference on Computer Vision and Pattern Recognition, 2016, pp. 2818-2826.
Xie et al., "Aggregated residual transformations for deep neural networks," CoRR, 2016, arXivpreprintarXiv:1611.05431, 10 pages.
Xie et al., "Genetic CNN," CoRR, 2017, arXivpreprintarXiv:1703.01513, 10 pages.
Yao et al., "Evolving artificial neural networks," Proceedings of the IEEE, 1999, 87(9):1423-1447.
Zagoruyko et al., "Wide residual networks,"CoRR, 2016, arXiv:1605.07146, 15 pages.
Zhong et al., "Practical Block-wise Neural Network Architecture Generation," CoRR, Aug. 2017, https://arxiv.org/abs/1708.05552, 11 pages.
Zoph et al., "Learning transferable architectures for scalable image recognition," CoRR, 2017, arXivpreprintarXiv:1707.07012, 14 pages.
Zoph et al., "Neural architecture search with reinforcement learning," CoRR, 2016, arXivpreprintarXiv:1611.01578, 16 pages.
Office Action in Chinese Appln. No. 201880070077.2, dated Oct. 10, 2023, 22 pages (with English translation).

* cited by examiner

$1 \times 1\ conv \quad 3 \times 3\ conv \quad 3 \times 3\ max - pooling$ $$\sigma_1^{(1)} \quad\quad \sigma_2^{(1)} \quad\quad \sigma_3^{(1)}$$

$\sigma_2^{(2)}$            $\sigma_3^{(2)}$ (a)        Fig. 3        (b)

USING HIERARCHICAL REPRESENTATIONS FOR NEURAL NETWORK ARCHITECTURE SEARCHING

CROSS-REFERENCE TO RELATED APPLICATION

This application is a National Stage Application under 35 U.S.C. § 371 and claims the benefit of International Application No. PCT/EP2018/079401, filed Oct. 26, 2018, which claims priority to U.S. Application No. 62/578,356, filed Oct. 27, 2017, the entire contents of which are hereby incorporated by reference herein.

BACKGROUND

This specification relates to systems and methods for automatically determining neural network architectures.

Neural networks are machine learning models that employ one or more layers of nonlinear units to predict an output for a received input. Some neural networks include one or more hidden layers in addition to an output layer. The output of each hidden layer is used as input to the next layer in the network, i.e., the next hidden layer or the output layer. Each layer of the network generates an output from a received input in accordance with current values of a respective set of parameters.

Some neural networks are recurrent neural networks. A recurrent neural network is a neural network that receives an input sequence and generates an output sequence from the input sequence. In particular, a recurrent neural network can use some or all of the internal state of the network from a previous time step in computing an output at a current time step. An example of a recurrent neural network is a long short term memory (LSTM) neural network that includes one or more LSTM memory blocks. Each LSTM memory block can include one or more cells that each include an input gate, a forget gate, and an output gate that allow the cell to store previous states for the cell, e.g., for use in generating a current activation or to be provided to other components of the LSTM neural network.

SUMMARY

This specification describes a system and method, implemented as one or more computer programs on one or more computers in one or more locations, that determines a neural network architecture. The neural network architecture may, for example, be the architecture of a convolutional and/or recurrent neural network.

A neural network system comprising a neural network corresponding to the determined neural network architecture can be configured to receive any kind of digital data input and to generate any kind of score, classification, or regression output based on the input. For example, it may be a neural network system configured to classify input data, e.g. a data item captured by a sensor and characterizing the real world. For example, the data item may be an image, such as one captured by a camera, or a sound signal, such as one captured by a microphone. The neural network system may be trained by supervised learning based on a training set composed of instances of sensor data (e.g. real-world instances of sensor data, such as images captured by a camera; but in principle some or all of the instances of sensor data may be simulated) and corresponding labels indicating that the instance of sensor data is associated with one of a predetermined set of classes. The trained neural network system may be used by inputting real-world sensor data which was captured by a sensor into the neural network system, and obtaining a corresponding label as the output of the neural network system, indicative of the input sensor data being associated with one of the classes.

Alternatively, the neural network system may be configured to process a sequence of input data such as a sequence of words or data items, or it may be part of a generative neural network system, or it may be part of a reinforcement learning system, in which case it may generate an output identifying an action to be performed by an agent which may be, for example, a robot.

In general terms, the present disclosure proposes a computer-implemented method for automatically determining a neural network architecture which represents any given neural network architecture in a data structure defining a hierarchical set of directed acyclic graphs. Each graph has an input, an output, and a plurality of nodes between the input and the output.

As noted, the set of graphs hierarchical, defined at each of a plurality of levels. The levels may be associated with corresponding subsets of the nodes. The subset of nodes for each level includes the subset of nodes for the next higher level, plus additional node(s). The hierarchical representation includes, at each level, directed edges between respective pairs of the nodes of the corresponding subset of the nodes. An edge indicates that an operation is performed on an output of one of the nodes to generate an input to the other node. An edge between two nodes of a certain level of the representation may, at the next lower level, be represented instead by one or more additional nodes (i.e. nodes of the subset of nodes associated with the next lower level but which were not part of the subset of nodes associated with the certain level), and by edges between the two nodes of the certain level, and/or between those two nodes and the additional nodes, and/or between two of the additional nodes.

Each level may be associated with a corresponding set of operations. The operation between any pair of nodes of a given level except the lowest, may be one of the subset of operations associated with a lower level. At a lowest-but-one level, the operations associated with each edge may be selected from a set of primitive operations which constitute the lowest level of the hierarchy.

The method includes repeatedly generating new sample neural network architectures by modifying existing neural network architecture(s), and evaluating their fitness. The modification is performed by selecting a level of an existing neural network architecture, selecting two nodes at that level, and modifying, removing or adding an operation between those nodes. The modifying or adding operations are performed using operations associated with a lower level of the hierarchy.

Expressing the general concepts above more specifically, according to one innovative aspect a computer-implemented method for automatically determining a neural network architecture. The method represents a neural network architecture as a data structure defining a hierarchical set of graphs, in particular directed acyclic graphs. Each graph has an input, an output, and a plurality of nodes between the input and the output. Each node, or at least each apart from an input node for the hierarchy, corresponds to (outputs) a feature map within a neural network defined by the neural network architecture. The feature map may comprise an embedding, in a neural network represented by the architecture, of features derived from an input vector to the neural network. Two nodes are connected by a (directed) edge which connects an input node of the edge to an output node of the edge. Each edge corresponds to an operation performed on a feature map of the input node of the edge to provide a feature map to the output node of the edge. Thus each graph performs an operation, described later as a motif.

The hierarchical set of graphs comprises a plurality of hierarchical levels of graphs, in particular a lowest hierarchical level comprising one or more lowest level graphs, and one or more next higher hierarchical levels comprising one or more next level graphs. Operations (motifs) corresponding to edges of the one or more lowest level graphs are selected from a set of primitive neural network operations (in the later description the lowest level graphs are at level 2 and the primitive operations themselves are at level 1). Operations corresponding to edges of the one or more next level graphs are selected from a set of operations performed by the one or more lowest level graphs.

The method may comprise determining at least two sample neural network architectures, in particular by defining at least the operations performed by the edges in respective hierarchical sets of graphs representing the sample neural network architectures. These sample architectures may be used to determine a neural network architecture for use in constructing a neural network. This may involve using a genetic algorithm, in which case the sample neural network architectures may be evolved over time. Alternatively it may involve a random search algorithm, in which case the sample architectures may be evaluated sequentially until a satisfactory architecture is identified. Alternatively other techniques may be employed.

Thus the method may still further comprise generating sample neural networks having the sample neural network architectures, training the sample neural networks, evaluating the sample neural networks by determining a fitness value for each of the sample neural networks, and then selecting one or more of the sample neural network architectures according to the determined fitness values to determine a neural network architecture. The fitness value may be calculated using a fitness test, which may for example be a test of how well a neural network system comprising the sample neural network, and trained to perform a computational test, performs that task.

In some implementations the plurality of hierarchical levels of graphs comprises a succession of next higher hierarchical levels. Operations corresponding to edges of each hierarchical level are selected from a set of operations performed by one or more graphs of at least one preceding (lower) level in the succession, that is motifs of a preceding level. These may but need not be exclusively from the immediately preceding level—for example an operation at a level may also include one or more primitive operations such as the no-connection/no-edge operation described below.

The set of primitive neural network operations may include, for example, one or more convolution operations, of which some or all may be of stride one. Preferably such a convolution operation is configured such that that when performed on a feature map it leaves an input resolution of the feature map unchanged. This can facilitate chaining of operations at different levels in implementations of the method. For similar reasons a convolution operation may be followed by a batch normalization operation. Multiple convolution operations may be provided, for example of different kernel sizes, and/or of separable/non-separable types.

The set of primitive neural network operations may additionally or alternatively include an identity operation, that is an operation that when performed on a feature map leaves the feature map substantially unchanged. This can be advantageous because can allow nodes to effectively be added to/removed from a graph, by changing whether two nodes are equivalent to one another.

The set of primitive neural network operations may additionally or alternatively include a no-connection operation which defines that there is no direct connection between the nodes linked by the edge to which the operation corresponds. This is effectively a no-edge operation in that the no-connection operation effectively defines that there is no edge between the nodes. That is, the output of one of the nodes does not pass as an input to the other.

The set of primitive neural network operations may additionally or alternatively include one or more of a max pooling operation, an average pooling operation, and a recurrent operation such as an LSTM or GRU (gated recurrent unit) operation.

Determining the at least two sample neural network architectures may include initializing a population of sample neural network architectures. This may comprise initializing at least one instance of the data structure defining the hierarchical set of graphs by defining at least the operations performed by the edges of the hierarchical set of graphs, in some implementations to the identity operation. Then these operations may be mutated by randomly modifying the operations performed by the edges of the hierarchical set of graphs. Such initialization can be useful for various search procedures including random search, in which case just one sample architecture may be generated/initialized for each search iteration.

For a genetic algorithm a larger population of sample neural network architectures may be employed. The selecting may then comprise comparing the fitness values of sample neural network architectures from the population against one another. This may be done by any of a range of fitness/reward-based selection mechanisms used for genetic algorithms, but tournament selection has been found to work particularly well. Preferably tournament selection is employed with a significant proportion of the population, for example equal to or greater than 1%, 3% or 5%. Thus determining the sample neural network architectures may further comprise mutating a sample neural network architecture selected according to the determined fitness value and repeating the generating, training, evaluating and selecting to evolve the sample neural network architecture(s).

The mutating may comprise selecting one of the hierarchical levels, selecting a graph (motif) in the selected level, and selecting a predecessor node and a successor node in the selected graph. Some or all of the selections may be random. The predecessor node and successor node may be selected such that, in the neural network before the mutation, no output of the successor node passes to the predecessor node (directly, or via other nodes). That is, the predecessor node and a successor node may be selected to be consistent with the existing edges/operations, to ensure that the mutation does not change the acyclic nature of the graph; generally in a directed acyclic graph there is an inherent topological ordering.

The mutating may further comprise replacing an operation corresponding to an edge connecting the selected nodes with another operation, which may be randomly selected. Selecting the same operation as the original operation may, but need not be permitted.

In some implementations the selecting further comprises providing a plurality of evaluation workers, which may be implemented as software agents, each configured to evaluate a sample neural network architecture. Sample neural network architectures may be allocated to the workers for evaluation as each worker becomes available. For example a worker may pick a sample from a data queue defining architectures for evaluation. Each worker may then perform the generating, training and evaluating of a sample neural network having the corresponding architectures. When finished the worker may, asynchronously, be allocated a further sample neural network architecture for evaluation. The evaluation results generated by the workers may be added to a shared data store. A controller software also have access to the shared data store for controlling selecting of the architectures according to their evaluation results.

Many different techniques may be used for evaluating the fitness value, that is the performance of a neural network, including, for example, the network's accuracy at performing a computational task such as a classification task, a loss or cost function within the network, or a score/reward obtained in a reinforcement learning task. Where an error or average error is determined, the fitness value may be a negative of this error. The fitness value of a sample neural network may optionally be determined as a measure of the performance of a (larger) neural network system comprising one or more instances of the sample neural network, in performing a computational task.

The method may further include designing a neural network according to the determined neural network architecture if any further design work is necessary, and/or constructing a neural network with the architecture. The constructing may be automatic. It may include incorporating one or more instances of the determined neural network architecture into a (larger) neural network system. The method may further include using neural network for training and/or inference; or making the neural network available for use, for example for training and/or inference, via an API (application programming interface). Thus one use case of implementations of the method/system involves a user providing data for machine learning processing; the method/system may then be used to generate, in particular evolve a neural network architecture; and then a neural network with the architecture may be made available for the user to use.

In a related aspect a system to automatically determine a neural network architecture comprises a data structure memory to store data structures. Each data structure is configured to represent a neural network architecture as a hierarchical set of graphs. Each graph may have an input, an output, and a plurality of nodes between the input and the output. A node may correspond to a feature map within a neural network defined by the neural network architecture, e.g. in the sense of outputting that feature map. The input to the node may be one or more feature maps which are the outputs of other nodes. Each pair of nodes may be connected by an edge. Each edge may connect an input node of the edge to an output node of the edge and may correspond to an operation performed on a feature map of the input node of the edge to provide a feature map to the output node of the edge, such that each graph performs an operation.

The hierarchical set of graphs may comprise a plurality of hierarchical levels of graphs, a lowest hierarchical level comprising one or more lowest level graphs and a next higher hierarchical level comprising one or more next level graphs. Operations corresponding to edges of the one or more lowest level graphs may be selected from a set of primitive neural network operations. Operations corresponding to edges of the one or more next level graphs may be selected from a set of operations performed by the one or more lowest level graphs. The system may include a sample module to define at least two sample neural network architectures by defining at least the operations performed by the edges in respective hierarchical sets of graphs representing the sample neural network architectures. The system may also include an evaluation module to generate sample neural networks having the sample neural network architectures; train the sample neural networks; evaluate the sample neural networks by determining a fitness value for each of the sample neural networks; and/or select one or more of the sample neural network architectures according to the determined fitness values.

The subject matter described in this specification can be implemented in particular embodiments so as to realize one or more of the following advantages.

Embodiments of the above described systems and methods can produce neural network architectures with performance in a computational task (such as processing sensor data to generate an output classifying the data, or generating control data) which is as good as or better than human-designed neural networks, and in a much shorter space of time. Thus, the embodiments of the method lead to an improved computer system, which, for a given level of computational training resources (e.g. processor time), can be trained to perform computational tasks, such as sensor data classification, with higher efficiency.

Furthermore, embodiments of the described systems and methods, have been found to perform neural network architecture searches with a large saving in computational resources (e.g. reduced processing time used by a processor unit with a given processing rate) compared to known algorithms for performing architecture searches. In various experiments, an increase in speed by a factor in the range 6 to over 200 was observed compared to known techniques, to produce a neural network architecture which performed an image classification task to substantially the same level of accuracy, or in some cases better.

The neural network generated by the described method may be implemented in hardware as a novel computer system, which comprises a plurality of processor units which implement the respective functions of nodes and edges of the neural network, the processor units being connected by physical signal paths (electrical and/or optical circuitry) designed by method. The neural network thus has a different hardware architecture to any existing computer system. Alternatively, the method may be implemented by one or more processors which simulate the processor units and signal paths of the novel hardware architecture.

BRIEF DESCRIPTION OF THE DRAWINGS

Examples of the disclosed method will now be described, for the sake of example, only with reference to the following figures in which:

FIG. 4, which is composed of FIGS. 4(a) and 4(b), shows the formation of a level 3 motif in the method of FIG. 2 using the level 2 motifs of FIGS. 2 and 3;

DETAILED DESCRIPTION OF THE EXAMPLES

Below an example of method according to the present disclosure for determining (generating) a neural network architecture is described, with reference to FIG. 5. Before that, we describe neural networks which are produced by the method.

Each neural network has a neural architecture which can be represented as a directed acyclic graph, composed of a plurality of nodes connected pairwise by directed edges. The nodes comprise at least one input node and at least one output node. For simplicity we will consider the case that there is a only a single input node ("single source") and single output node ("single sink"), such that the neural network transforms the input at the source to the output at the sink. The network is acyclic in the sense that no path exists which starts from any given node, extends along the directed edges (in the direction of the edges), and returns to the given node.

Each node of the graph may generate a feature map based on its inputs. The feature map may be an array (e.g. a two-dimensional array, but in variations of the example the array may have any other dimensionality) of vectors. Each vector has one or more components; typically each vector of the feature map has the same (plural) number of components.

Each directed edge, extending from a first of the nodes to a second of the nodes, is associated with a corresponding one of a set of primitive operations that transforms the feature map in the first node to produce a feature map which the edge passes to the second node.

Formally, a neural network consists of a number of nodes, labelled by variable i, each of which forms a feature map $x_i$ from its inputs. The nodes are connected in pairs by directed edges. A directed edge from a first node i to a second node j performs an operation on the feature map $x_i$ to generate an input for the second node. The neural network architecture is defined by the representation (G, o), consisting of two elements:

1. A pool of available operations $o=\{o_1, o_2, \ldots\}$.
2. An adjacency matrix G specifying the neural network graph of operations, where $G_{ij}=k$ means that the graph contains nodes i and j, with a directed edge from node j to node i which corresponds to the k-th operation $o_k$.

The architecture, which may alternatively be denoted arch, is obtained by assembling operations o according to the adjacency matrix G:

$$\text{arch}=\text{assemble}(G,o). \quad (1)$$

The single input node may be designated by i=1. The number of nodes is |G|, and the output node is i=|G|. The other nodes are numbered such that the set of nodes j from which it is possible to reach a given node i by moving along one of the edges in the direction specified by the edge have a label which is less than i (the network is acyclic which guarantees that this topographical ordering will be possible). This set of nodes is referred to as the direct predecessor nodes of node i. Thus, the feature map $x_i$ of node i is obtained from the feature maps $x_j$ of its direct predecessor nodes following the topological ordering:

$$x_i=\text{merge}[\{o_{G_{ij}}(x_j)\}_{j<i}], i=2 \ldots |G| \quad (2)$$

Here, merge is an operation combining multiple feature maps into one. In one example this can be implemented as depthwise concatenation (i.e $x_i$ is a concatenation of the vectors $\{o_{G_{ij}}(x_j)\}_{j<i}$. An alternative way of performing the merge operation is by element-wise addition. However, this is less flexible since it requires the incoming feature maps to contain the same number of channels (components). In any case, a merge operation of this kind can be performed by a chain of two nodes which each perform a merge operation by concatenation, joined by a directed edge which performs a 1×1 convolution.

A key idea of the hierarchical neural network architecture representation is that the neural network architecture is constructed according to a hierarchy consisting of a plurality of levels. Each level except the lowest is associated with a subset of the nodes. The highest level may for example just be associated with the single input node and the single output node. Each lower level is associated with the subset of nodes for the next higher level, plus one or more additional nodes. The lowest-but-one level ("level 2") is associated with all the nodes of the neural network architecture. At each level except the lowest, we can represent the flow of data between two nodes associated with that level by directed edges between a respective pair of the nodes associated with that level. Thus, for level 2, the edges, as explained above, each represent respective one of the pool of available operations (referred to as available operations), while at each higher level an edge represents the flow of data between two nodes of that level, typically via node(s) of one or more lower levels.

One or more motifs are defined at each level of the hierarchy, where, except for the lowest level, each motif of a given level is composed of motifs of lower levels. That is, lower level motifs are reused as building blocks (operations) during the construction of higher-level motifs. Specifically, each motif of a given level, except the first level, may be composed of motifs of the immediately lower level.

Consider a hierarchy of L levels where the l-th level contains $M_l$ motifs. The highest-level l=L contains only a single motif corresponding to the full architecture, and the lowest level l=1 is the set of primitive operations. We recursively define $o_m^{(l)}$, the m-th motif in level l, as the composition of lower-level motifs $$o^{(l-1)} = \{o_1^{(l-1)}, o_2^{(l-1)}, \ldots \}.$$

Using this approach the network structure matrix G can be decomposed into the set of matrices $$\{G_m^{(l)}\}$$

which each correspond to one of the motifs (i.e. the m-th motif of level l) according to its network structure, such that we can write the m-th motif of the l-th level as:

$$o_m^{(l)}=\text{assemble}(G_m^{(l)},o^{(l-1)}) \forall l \in 2, \ldots, L$$

A hierarchical neural network architecture representation is provided by the data structure $$(\{\{G_m^{(l)}\}_{m=1}^{M_l}\}_{l=1}^{L}, o^{(1)}),$$

which is determined by the network structures of motifs at all levels and the set of bottom-level primitives.

Figure 1:
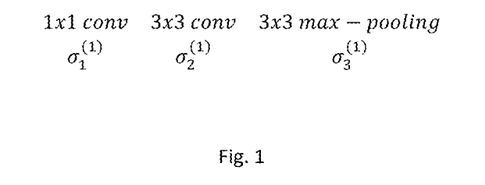
FIG. 1 illustrates primitive operations which may be used in a method according to the present disclosure.

We now consider the primitive operations at level l=1 of the hierarchy. In one example there are six such primitive operations (l=1, $M_l$=6), as follows:

1×1 convolution of C channels
3×3 depthwise convolution of C channels
3×3 separable convolution of C channels
3×3 max-pooling
3×3 average-pooling
identity Three of the six possible such primitive operations are illustrated in FIG. 1. Each of these primitive operations is well-known in the field of convolutional neural networks, and may be summarized as follows.

A first primitive operation, denoted by $\sigma_1^{(1)}$, is a 1×1 convolution. That is, an operation which, upon receiving two-dimensional array of first vectors of equal length, forms a second two-dimensional array of the same number of second vectors in which each second vector is a function (normally a linear function) of the corresponding one of the first vectors; each second vector is generated from the corresponding first vector using the same function.

A second primitive operation, denoted by $\sigma_2^{(1)}$, is a 3×3 depthwise convolution. This is another operation which, upon receiving two-dimensional array of first vectors of equal length, forms a second two-dimensional array of second vectors, but in this case each of the second vectors is formed as a function (normally a linear function) of the first vectors in a corresponding 3×3 patch of the two-dimensional array of first vectors. The patches may be overlapping. Again each second vector is generated using the same function, except that optionally second vectors at the edge of the two-dimensional array may be generated by a modified function which operates on a smaller number of the first vectors. The convolution is depthwise, in which components of the second vector are formed from (only) the corresponding components of the patch of first vectors.

Note that another one of the six primitive operations (not shown in FIG. 1) is a separable convolution, in which the convolution kernel is separable as the outer product of two vectors. A separable convolution may be equivalent to a depthwise convolution followed by a 1×1 convolution.

A further possible primitive operation, denoted by $\sigma_3^{(1)}$, is a 3×3 max pooling operation That is another operation which, upon receiving two-dimensional array of first vectors of equal length, forms a second two-dimensional array of second vectors, and each second vectors is formed from a corresponding 3×3 patch of the two-dimensional array of first vectors, but in this case each component of each second vector is the maximum of the corresponding components of the first vectors in the patch.

Similarly, another of the six possible primitive operations (not shown in FIG. 1) is a 3×3 average pooling operation, which differs from the 3×3 max pooling operation in that each second vector is formed from a corresponding 3×3 patch of the array of first vectors, such that each component of each second vector is the average of the corresponding components of the first vectors of the patch.

In one example, all primitives are of stride one and the convolved feature maps are padded to preserve their spatial resolution. All convolutional operations may be followed by batch normalization (i.e. increased/decreased by a first value, and multiplied by a second value, to give zero mean and unit variance), and ReLU activation (i.e. set to the higher of (i) their value, and (ii) zero). The number of output channels for each convolution operation is fixed to be a constant C (e.g. by padding). We note that convolutions with larger receptive fields and more channels can be expressed as motifs composed of such primitives. Indeed, large receptive fields can be obtained by stacking 3×3 convolutions in a chain structure, and wider convolutions with more channels can be obtained by merging the outputs of multiple convolutions through depthwise concatenation.

The identity operation is a primitive operation which, when it is associated with the directed edge connecting node i and node j, outputs the feature map $x_i$ to the node j.

We also introduce a special "none" operation, which indicates that there is no edge between nodes i and j. It is added to the pool of operations at each level.

Figure 2:
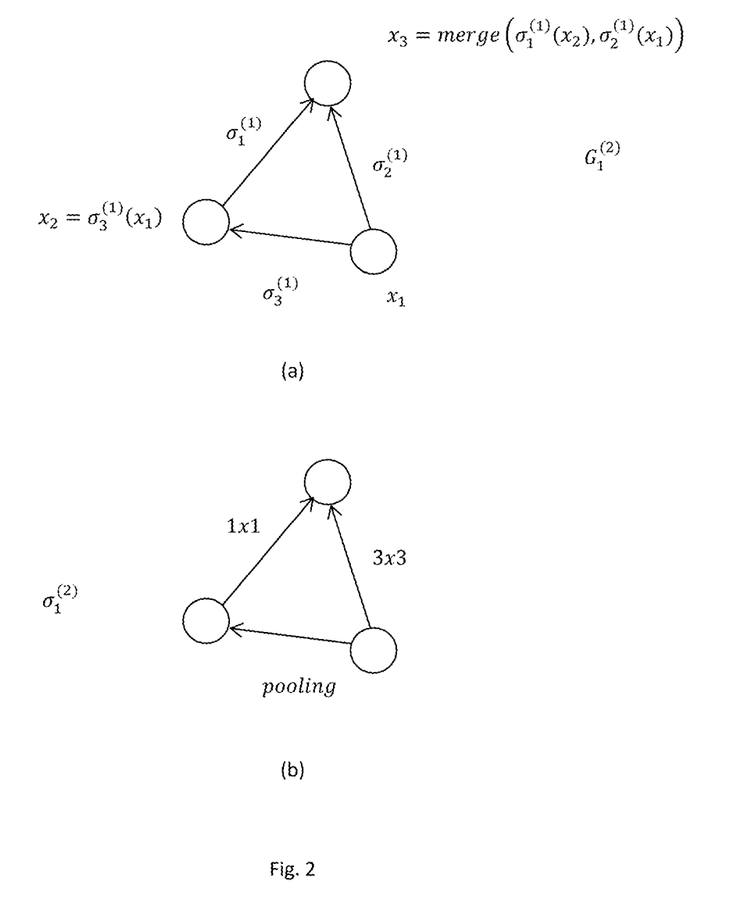
FIG. 2, which is composed of FIGS. 2(a) and 2(b), illustrates the formation of a level 2 motif in the method according to the present disclosure using the primitive operations of FIG. 1.

FIG. 2(a) illustrates an example of a possible level 2 network structure $G_1^{(1)}$ defined using the primitive operations of FIG. 1, and FIG. 2(b) shows how these primitives are assembled based on $G_1^{(2)}$ into the corresponding level 2 motif $\sigma_1^{(2)}$. FIGS. 3(a) and 3(b) shows two further level 2 motifs $\sigma_2^{(2)}$ and $\sigma_3^{(2)}$.

Figure 3:
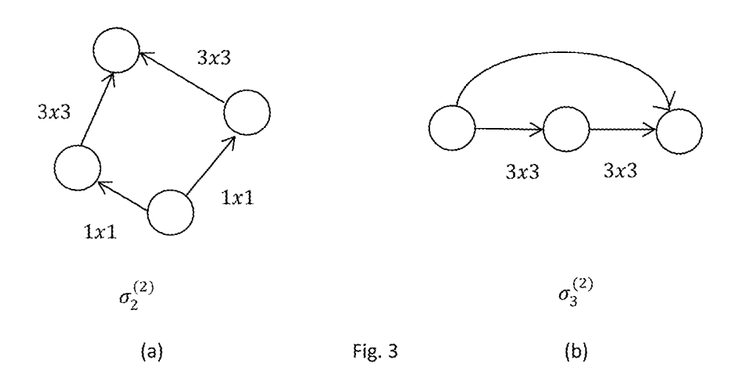
FIG. 3, which is composed of FIGS. 3(a) and 3(b), shows two other level 2 motifs.
Figure 4A:
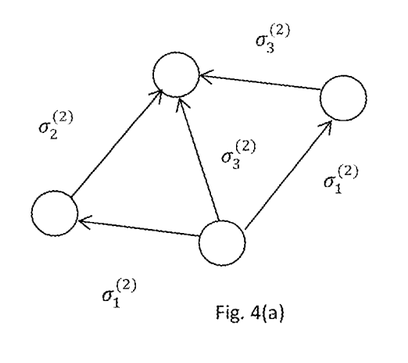
Figure 4B:
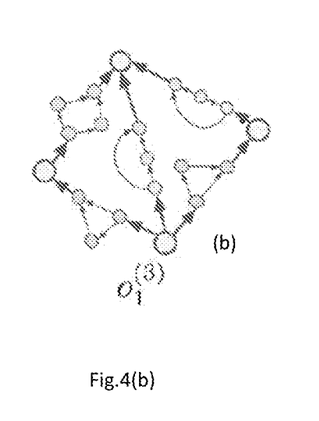

FIG. 4(a) shows a level 3 network structure $G_1^{(3)}$, and FIG. 4(b) shows how the primitives of FIG. 2(b) and FIG. 3 are assembled based on $G_1^{(3)}$ to form a level 3 motif $\sigma_1^{(3)}$.

Figure 5:
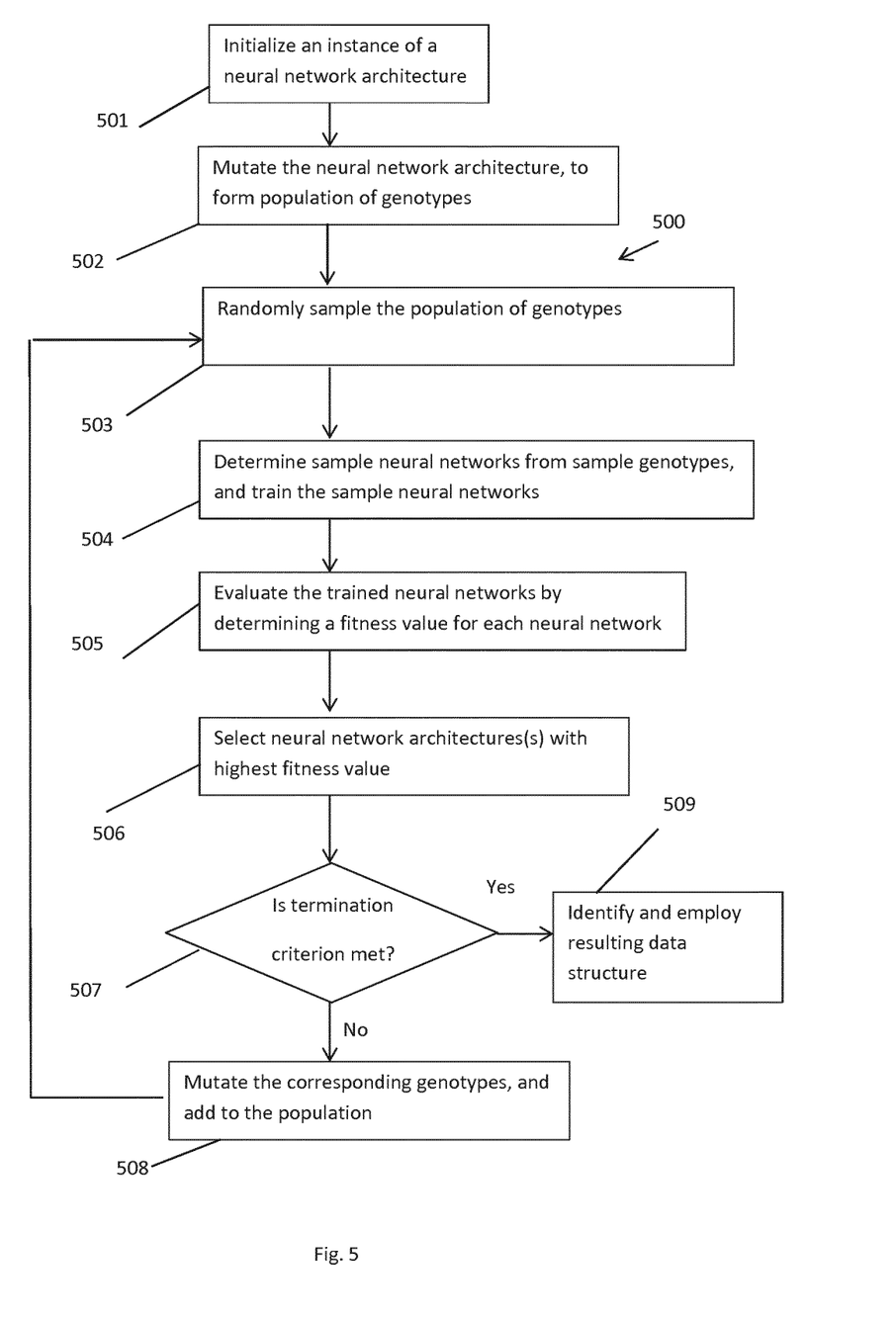
FIG. 5 is a flow diagram showing steps of a method according to the present disclosure to determine a neural network architecture, and use the determined neural network architecture to perform a computational task.

We now explain a computer-implemented method 500 which is an example according to the present disclosure, with reference to FIG. 5. The method employs an evolutionary strategy over neural network architectures by treating instances of the neural network architecture representations (G, o) as genotypes.

Steps 501 and 502 are to initialize a population of genotypes. In 501, at least one initial genotype is created. The initial genotype is a neural network architecture representation representing a hierarchical neural network with a plurality of levels L (which is greater than one, and preferably greater than two). For example, the (or each) initial genotype may be created as a "trivial" genotype, which is a neural network representation representing a neural network in which the only motif at each level is a chain of identity mappings. Thus, the only primitive operation used in the initial genotype is the identity primitive.

In step 502, the initial genotype(s) are diversified by applying a plurality of random mutations, to form a population of neural network representations. For example, starting with a single one of the initial genotype(s), a plurality of genotypes (neural network architecture representations) may be formed by applying a respective plurality of mutations to the initial genotype(s). Note that this is in contrast to some known techniques in which all the initial genotypes are trivial networks. The diversification step 502 provides an improved initial coverage of the search space with non-trivial architectures, and helps to avoid a bias introduced by handcrafted initialization routines. In fact, even some of the neural networks represented by the genotypes generated in step 502 may be reasonably well-performing according to the fitness test discussed below.

The mutation of step 502 may be carried out using the following action space. A single mutation consists of the following sequence of actions:

1. Select a value for l in the range 2 to L. This amounts to sampling a non-primitive level (the "target level") which is not the primitive level (l=1).
2. Sample a motif m in the target level (the "target motif").
3. Sample a random node i in the target motif (the "successor node") which is not the input node of the motif.
4. Sample a random node j in the target motif (the predecessor node) which is not the node i, and is not a successor of the node i (i.e. neither a direct successor nor an indirect successor, i.e. not a node from which node i can be reached by following multiple directed edges).

5. Replace the current operation $o_k^{(l-1)}$ from j to i with a randomly sampled operation $o_{k'}^{(l-1)}$.

In the case of flat genotypes which consist of two levels (one of which is the level of fixed primitives), the first step is omitted and/is set to 2. The mutation can be summarized as:

$$[G_m^{(l)}]_{ij} = k' \qquad (4)$$

where (l, m, i, j, k) are randomly sampled from their respective domains. Notably, the mutation process is powerful enough to perform various modifications on the target motif, such as:

1. Add a new edge: if $o_k^{(l-1)}$=none and $o_{k'}^{(l-1)} \neq$ none
2. Alter an existing edge: if $o_k^{(l-1)} \neq$ none and $o_{k'}^{(l-1)} \neq$ none and $o_k^{(l-1)} \neq o_{k'}^{(l-1)}$
3. Remove an existing edge: if $o_k^{(l-1)} \neq$ none and if $o_{k'}^{(l-1)}$=none Steps 503-508 implement an evolutionary search algorithm based on tournament selection. Starting from an initial population of random genotypes, tournament selection provides a mechanism to pick at least one promising genotype from the population, and to place its mutated offspring back into the population. By repeating this process, the quality of the population keeps being refined over time. The genotype with the highest fitness value (e.g. validation accuracy obtained by training a neural network system including a neural network based on the genotype from scratch for a fixed number of steps) among the entire population when a termination criterion is met (e.g. a fixed amount of time has passed) is selected as the final output (determined neural network architecture).

Specifically, in step 503 a sample (i.e. a number K which is at least two and preferably greater, but less than the number of genotypes in the population) of the plurality of genotypes in the population are randomly selected from the current genotype population, e.g. 5% of the population.

In step 504, each sample genotype (instance of the data structure) is assembled to form a corresponding sample neural network, and the sample neural networks are trained. Each sample neural network may be initialized with random weights (or in a variation equal weights). Thus 504 does not rely on weight inheritance, though incorporating it into step 504 is straightforward. The training may use a fixed number of training steps to train each network.

In step 505 the fitness of the trained networks is evaluated using a fitness test to derive a fitness value for each sample neural network. The fitness values for each sample neural network are stored in memory.

If steps 504 and 505 are not being performed for the first time (see below) such that a given sample neural network has already been trained an evaluated, step 504 may be omitted in respect of that sample neural network and in step 505 the evaluation result may be retrieved from the memory.

In one implementation, for a given sample genotype, the training and evaluation in steps 504 and 505 may include forming a first neural network system using a neural network generated from the sample genotype as a component. The sample neural network generated from the sample genotype may be termed a neural network section ("cell") of the first neural network system. For example, the first neural network system may be generated according to a first template (e.g. a predetermined architecture) of multiple neural network sections, e.g. arranged sequentially in a feedforward manner. One or more of the neural network sections of the template may be implemented as a neural network generated from the genotype. One or more of other neural network sections of the template may be implemented in some other way, e.g. as a predetermined set of one or more layers, such as a convolutional layer, a pooling layer and/or a softmax layer.

In this case, in step 504, the first neural network system may then be trained (e.g. by standard neural network training algorithm, such as supervised learning, based on a training set) to perform a computational task, including training the neural network section(s) which are generated from the sample genotype. In step 505, the fitness test may then be a measure of the success of the trained first neural network system in performing the computational task.

In step 506, the neural network having highest fitness value, as evaluated in step 505, is identified (wins the tournament) and selected. In a variation more than one of the neural networks can be identified and selected at this stage, e.g. a predetermined number of the neural networks having the highest fitness values.

In step 507 it is determined whether a termination criterion has been met (e.g. the set of steps 503-506 has been carried out for at least a predetermined number of times). If the determination is positive, the method 500 passes to step 509 (discussed below).

Alternatively, if the determination in step 507 is negative then in step 508 the sample genotype(s) from which the neural network(s) selected in step 506 were assembled, are mutated, by the process described above in relation to step 502. The mutated genotypes (additional instances of data structures) are added to the population. The process then returns to step 503. Thus, the set of steps 503-508 constitutes a loop which is typically carried out multiple times (e.g. at least 40 times).

Note that the selection pressure is controlled by the tournament size, which is set to 5% of the population size in our case. In method 500 no genotypes are removed from the population, allowing it to grow with time, thereby maintaining architecture diversity.

The method 500 may be implemented by an asynchronous distributed system, which consists of a single controller responsible for performing evolution over the genotypes (steps 501-502 and 506-508), and a set of $N_w$ workers. Both the controller and the workers have access to a shared tabular memory M recording the population of genotypes and their fitness, as well as a data queue Q containing the genotypes with unknown fitness which should be evaluated.

The workers are responsible for their evaluation (steps 503, 504 and 505). A worker will pick up an unevaluated genotype from Q whenever there is one available, assemble it into an architecture, carry out training and validation, and then record the validation accuracy (fitness) in M.

Additionally, the controller performs steps 506 and 508 by controlling any of the workers which is currently idle (e.g. not able to begin performing steps 504 and 505 because the Q is empty) to perform steps 506 and 508. Specifically, the controller will perform tournament selection of a genotype from M whenever a worker becomes available, followed by the mutation of the selected genotype and its insertion into Q for fitness evaluation.

Note that no synchronization is required, and all workers can be fully occupied during architecture evolution.

In step 509, one of the genotypes in the population of genotypes is selected as the "determined neural network architecture", and this is optionally used in a subsequent programming task, which may be the programming task used in steps 504 and 505. The determined neural network architecture may be the genotype from which a neural network was generated which achieved the highest fitness value out of all the times in which step 505 was performed.

The determined neural network architecture may be used to form a new neural network (by performing the merge operation on it), and then training it (e.g. for a new task).

In one possible implementation of step 509, the neural network corresponding to the determined neural network architecture is used as one or more components ("cells") of a second neural network system. The second neural network system may be formed using a second template (e.g. a predetermined architecture) of multiple neural network sections, e.g. arranged sequentially in a feedforward manner. One or more of the neural network sections may be implemented as a neural network generated from the determined neural network architecture. Alternatively or additionally, one or more of the other neural network sections may be implemented in some other way, e.g. as a predetermined set of one or more layers, such as a convolutional layer, a pooling layer and/or a softmax layer.

The second neural network system may then be trained to perform a computational task, e.g. including training the neural network section(s) which are generated from the determined neural network architecture. The computational task may be the same one as used in step 504 and 505.

Preferably the first and second templates are different. The first template preferably defines a smaller neural network system than the second template. In particular, the second template may include more neural network sections (e.g. the second neural network system may comprise more instances of neural networks formed using the determined neural network architecture than the first neural network systems comprise instances of a sample neural network). Performing steps 504 and 505 using a smaller neural network system from that specified by the second template of step 509, means that steps 504 and 505, which have to be performed many times to generate the determined neural network architecture, can be performed with less computational cost than the computational cost of step 509, which only has to be performed once.

Note that in a variation of the method 500, steps 503, 507 and 508 are omitted. Instead, all the population of genotypes generated in step 502 are used in step 504 to generate respective trained neural networks, and all are evaluated in step 505. In step 506, the trained neural network with the highest fitness value is selected as the determined neural network architecture, and then the method passes to step 509. An advantage of this variation of the method 500 is that it can be run in parallel over the entire population, substantially reducing the search time.

Figure 6:
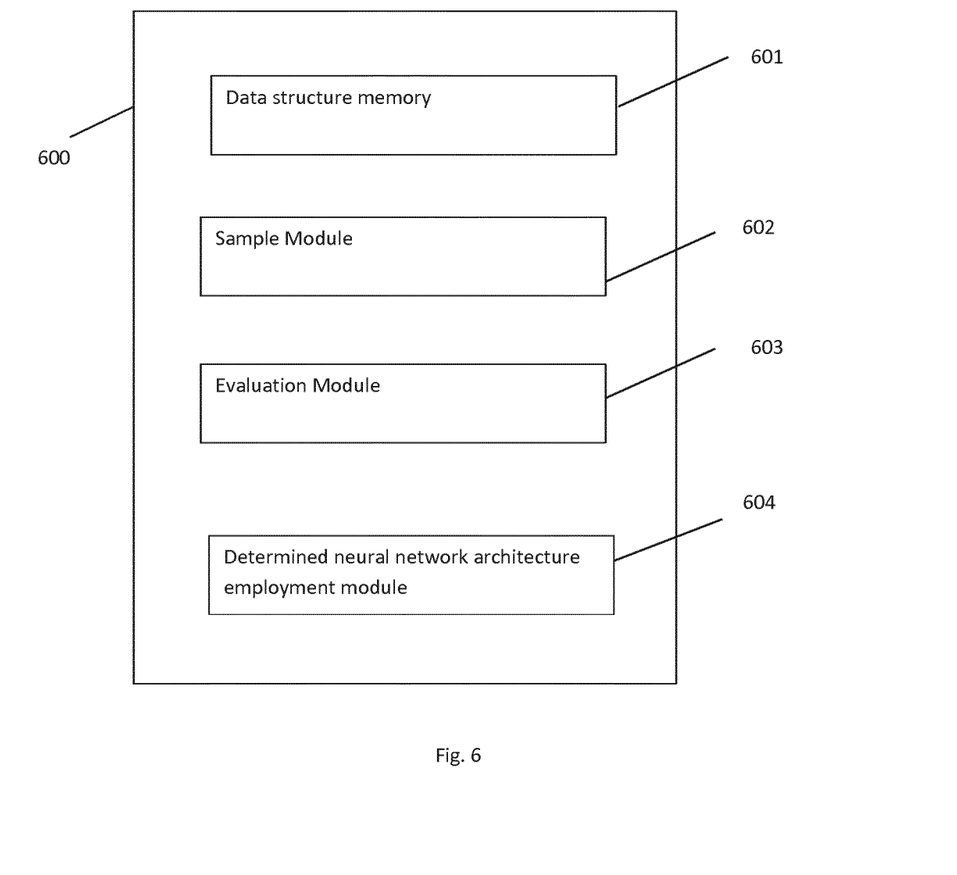
FIG. 6 shows schematically the construction of a system for performing the method of FIG. 1.

FIG. 6 illustrates a system 600 for performing the method 500. It includes a data structure memory 601 for storing data including the population of data structures (genotypes). It further includes a fitness module 602 which may perform steps 501, 502 and 508 of the method 500, and an evaluation module 603 which may perform steps 503-507 of the method 500. It further includes a determined neural network architecture employment module 604 for performing the step 509. During the loop of steps 503-508, the workers may be allocated dynamically to the fitness module 602 or to the evaluation module 603. This permits advantages of parallelism to be efficiently realized.

In experiments using a standard learning problem, methods and systems as described above were able to produce the second neural network system with a training time which was reduced by over 97% compared to a conventional neural network training technique, while producing a superior quality of results. This is significant since the computational processing time associated with neural network architecture search techniques have previously been enormous.

Specifically, in an image classification task using the CIFAR-10 training set, and using 40,000 training images and 10,000 validation images, it took 1.5 days using 200 P100 GPUs (graphics processing units) to perform an evolutionary search by a method 500 over 7000 steps. Using the variation of method 500 discussed in the preceding paragraphs, it took one hour using the 200 P100 GPUs to perform a search over 200 architectures. By contrast, known techniques took 11 days using 250 GPUS, and 4 days using 450 GPUs. It was found that the neural network system produced in one hour using the variation of method 500, performed the image classification task substantially as well as these known techniques (i.e. with much the same classification error), despite having been produced using less than 1% of the processor time. The neural network system produced using the method 500 performed the classification task with a lower classification error than the neural network system produced using the variation of method 500.

In this document, for a system of one or more computers to be configured to perform particular operations or actions means that the system has installed on it software, firmware, hardware, or a combination of them that in operation cause the system to perform the operations or actions. For one or more computer programs to be configured to perform particular operations or actions means that the one or more programs include instructions that, when executed by data processing apparatus, cause the apparatus to perform the operations or actions.

Embodiments of the subject matter and the functional operations described in this specification can be implemented in digital electronic circuitry, in tangibly-embodied computer software or firmware, in computer hardware, including the structures disclosed in this specification and their structural equivalents, or in combinations of one or more of them. Embodiments of the subject matter described in this specification can be implemented as one or more computer programs, i.e., one or more modules of computer program instructions encoded on a tangible non transitory program carrier for execution by, or to control the operation of, data processing apparatus. Alternatively or in addition, the program instructions can be encoded on an artificially generated propagated signal, e.g., a machine-generated electrical, optical, or electromagnetic signal, that is generated to encode information for transmission to suitable receiver apparatus for execution by a data processing apparatus. The computer storage medium can be a machine-readable storage device, a machine-readable storage substrate, a random or serial access memory device, or a combination of one or more of them. The computer storage medium is not, however, a propagated signal.

The term "data processing apparatus" encompasses all kinds of apparatus, devices, and machines for processing data, including by way of example a programmable processor, a computer, or multiple processors or computers. The apparatus can include special purpose logic circuitry, e.g., an FPGA (field programmable gate array) or an ASIC (application specific integrated circuit). The apparatus can also include, in addition to hardware, code that creates an execution environment for the computer program in question, e.g., code that constitutes processor firmware, a protocol stack, a database management system, an operating system, or a combination of one or more of them.

A computer program (which may also be referred to or described as a program, software, a software application, a module, a software module, a script, or code) can be written in any form of programming language, including compiled or interpreted languages, or declarative or procedural languages, and it can be deployed in any form, including as a stand alone program or as a module, component, subroutine, or other unit suitable for use in a computing environment. A computer program may, but need not, correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, sub programs, or portions of code. A computer program can be deployed to be executed on one computer or on multiple computers that are located at one site or distributed across multiple sites and interconnected by a communication network.

As used in this specification, an "engine," or "software engine," refers to a software implemented input/output system that provides an output that is different from the input. An engine can be an encoded block of functionality, such as a library, a platform, a software development kit ("SDK"), or an object. Each engine can be implemented on any appropriate type of computing device, e.g., servers, mobile phones, tablet computers, notebook computers, music players, e-book readers, laptop or desktop computers, PDAs, smart phones, or other stationary or portable devices, that includes one or more processors and computer readable media. Additionally, two or more of the engines may be implemented on the same computing device, or on different computing devices.

The processes and logic flows described in this specification can be performed by one or more programmable computers executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit). For example, the processes and logic flows can be performed by and apparatus can also be implemented as a graphics processing unit (GPU).

Computers suitable for the execution of a computer program include, by way of example, can be based on general or special purpose microprocessors or both, or any other kind of central processing unit. Generally, a central processing unit will receive instructions and data from a read only memory or a random access memory or both. The essential elements of a computer are a central processing unit for performing or executing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device, e.g., a universal serial bus (USB) flash drive, to name just a few.

Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments of the subject matter described in this specification can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the subject matter described in this specification, or any combination of one or more such back end, middleware, or front end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

While this specification contains many specific implementation details, these should not be construed as limitations on the scope of any invention or of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In certain implementations, multitasking and parallel processing may be advantageous.

What is claimed is:

1. A computer-implemented method for automatically determining a neural network architecture, comprising:

generating data representing the neural network architecture as a data structure defining a hierarchical set of graphs comprising a succession of hierarchical levels of graphs, each graph having an input, an output, a plurality of nodes between the input and the output, and one or more edges that each connect two respective nodes, wherein: a node corresponds to a feature map within a neural network defined by the neural network architecture, each edge connects an input node of the edge to an output node of the edge and corresponds to an operation performed on a feature map of the input node of the edge to provide a feature map to the output node of the edge, such that each graph performs an operation, the succession of hierarchical levels include a lowest hierarchical level and a plurality of additional hierarchical levels, generating the data comprises defining the hierarchical set of graphs, and defining the hierarchical set of graphs comprises:

defining the lowest hierarchical level comprising one or more lowest level graphs, wherein operations corresponding to edges of the one or more lowest level graphs are selected from a set of primitive neural network operations, and recursively defining the additional hierarchical levels, wherein each respective additional hierarchical level comprises a respective set of one or more graphs, wherein recursively defining each respective additional hierarchical level comprises, for each graph in the one or more graphs in the respective additional hierarchical level, selecting a set of lower-level graphs from the graphs in the hierarchical level that precedes the respective additional hierarchical level in the succession of hierarchical levels, and generating data representing the graph by assembling the lower-level graphs selected from the graphs in the hierarchical level that precedes the respective additional hierarchical level;

initiating a population of two or more sample neural network architectures based on the data structure defining the hierarchical set of graphs, wherein each respective sample neural network architecture in the population is initiated by modifying one or more of the operations performed by the edges of the hierarchical set of graphs;

generating sample neural networks having the sample neural network architectures in the population;

training the sample neural networks;

evaluating the sample neural networks by determining a fitness value for each of the sample neural networks; and selecting one or more of the sample neural network architectures in the population according to the determined fitness values to determine a neural network architecture.

2. The method of claim 1, wherein for each respective additional hierarchical level, the operations corresponding to the edges of the one or more graphs in the respective additional hierarchical level are selected from a set of operations performed by one or more graphs in a hierarchical level that precedes the respective additional hierarchical level in the succession of hierarchical levels.

3. The method of claim 1, wherein the set of primitive neural network operations includes an identity operation that when performed on a feature map leaves the feature map unchanged.

4. The method of claim 1, wherein the set of primitive neural network operations includes at least one convolution operation that when performed on a feature map leaves a resolution of the feature map unchanged.

5. The method of claim 1, wherein the set of primitive neural network operations includes at least one convolution operation followed by a batch normalization operation.

6. The method of claim 1, wherein the set of primitive neural network operations includes a no-connection operation which defines that there is no direct connection between the nodes linked by the edge to which the operation corresponds.

7. The method of claim 1, wherein the set of primitive neural network operations includes an identity operation that when performed on a feature map leaves the feature map unchanged and the initializing comprises initializing at least some of the operations performed by the edges of the hierarchical set of graphs to the identity operation.

8. The method of claim 1, wherein the selecting comprises comparing the fitness values of sample neural network architectures from the population against one another.

9. The method of claim 1, wherein determining at least two sample neural network architectures further comprises mutating a sample neural network architecture selected according to the determined fitness value and repeating the generating, training, evaluating and selecting to evolve the sample neural network architectures.

10. The method of claim 9, wherein the mutating comprises selecting one of the hierarchical levels, selecting a graph in the selected level, selecting a predecessor node and a successor node in the selected graph, and replacing an operation corresponding to an edge connecting the selected nodes with another operation.

11. The method of claim 1, wherein the selecting further comprises:

providing a plurality of evaluation workers each configured to evaluate a sample neural network architecture;

allocating sample neural network architectures to the workers for evaluation as each worker becomes available, wherein each worker performs the generating, training and evaluating of a sample neural network having a sample neural network architecture and, when finished, is allocated a further sample neural network architecture;

adding results of the evaluations to a data store shared by the evaluation workers; and controlling the selecting using the evaluations in the data store.

12. The method of claim 1, further comprising constructing a neural network according to the determined neural network architecture.

13. The method of claim 12, further comprising using the neural network in a neural network system for training and/or inference.

14. The method of claim 12, further comprising making the neural network available in a neural network system for training and/or inference via an API.

15. The method according to claim 13, wherein the neural network system includes multiple instances of the neural network.

16. A system comprising one or more computers and one or more storage devices storing instructions that when executed by the one or more computers cause the one or more computers to perform operations for automatically determining a neural network architecture, the operations comprising:
generating data representing the neural network architecture as a data structure defining a hierarchical set of graphs comprising a succession of hierarchical levels of graphs, each graph having an input, an output, a plurality of nodes between the input and the output, and one or more edges that each connect two respective nodes, wherein: a node corresponds to a feature map within a neural network defined by the neural network architecture, each edge connects an input node of the edge to an output node of the edge and corresponds to an operation performed on a feature map of the input node of the edge to provide a feature map to the output node of the edge, such that each graph performs an operation, the succession of hierarchical levels include a lowest hierarchical level and a plurality of additional hierarchical levels, generating the data comprises defining the hierarchical set of graphs, and defining the hierarchical set of graphs comprises:
defining the lowest hierarchical level comprising one or more lowest level graphs, wherein operations corresponding to edges of the one or more lowest level graphs are selected from a set of primitive neural network operations, and
recursively defining the additional hierarchical levels, wherein each respective additional hierarchical level comprises a respective set of one or more graphs, wherein recursively defining each respective additional hierarchical level comprises, for each graph in the one or more graphs in the respective additional hierarchical level, selecting a set of lower-level graphs from the graphs in the hierarchical level that precedes the respective additional hierarchical level in the succession of hierarchical levels, and generating data representing the graph by assembling the lower-level graphs selected from the graphs in the hierarchical level that precedes the respective additional hierarchical level;
initiating a population of two or more sample neural network architectures based on the data structure defining the hierarchical set of graphs, wherein each respective sample neural network architecture in the population is initiated by modifying one or more of the operations performed by the edges of the hierarchical set of graphs;
generating sample neural networks having the sample neural network architectures in the population;
training the sample neural networks;
evaluating the sample neural networks by determining a fitness value for each of the sample neural networks; and
selecting one or more of the sample neural network architectures in the population according to the determined fitness values to determine a neural network architecture.

17. The system of claim 16, wherein for each respective additional hierarchical level, the operations corresponding to the edges of the one or more graphs in the respective additional hierarchical level are selected from a set of operations performed by one or more graphs in a hierarchical level that precedes the respective additional hierarchical level in the succession of hierarchical levels.

18. The system of claim 16, wherein determining at least two sample neural network architectures includes initializing one or a population of sample neural network architectures by:
initializing at least one instance of the data structure defining the hierarchical set of graphs by defining at least the operations performed by the edges of the hierarchical set of graphs, and
mutating the at least one instance of the data structure by modifying the operations performed by the edges of the hierarchical set of graphs.

19. One or more non-transitory computer-readable storage media storing instructions that when executed by one or more computers cause the one or more computers to perform operations for automatically determining a neural network architecture, the operations comprising:
generating data representing the neural network architecture as a data structure defining a hierarchical set of graphs comprising a succession of hierarchical levels of graphs, each graph having an input, an output, a plurality of nodes between the input and the output, and one or more edges that each connect two respective nodes, wherein: a node corresponds to a feature map within a neural network defined by the neural network architecture, each edge connects an input node of the edge to an output node of the edge and corresponds to an operation performed on a feature map of the input node of the edge to provide a feature map to the output node of the edge, such that each graph performs an operation, the succession of hierarchical levels include a lowest hierarchical level and a plurality of additional hierarchical levels, generating the data comprises defining the hierarchical set of graphs, and defining the hierarchical set of graphs comprises:
defining the lowest hierarchical level comprising one or more lowest level graphs, wherein operations corresponding to edges of the one or more lowest level graphs are selected from a set of primitive neural network operations, and
recursively defining the additional hierarchical levels, wherein each respective additional hierarchical level comprises a respective set of one or more graphs, wherein recursively defining each respective additional hierarchical level comprises, for each graph in the one or more graphs in the respective additional hierarchical level, selecting a set of lower-level graphs from the graphs in the hierarchical level that precedes the respective additional hierarchical level in the succession of hierarchical levels, and generating data representing the graph by assembling the lower-level graphs selected from the graphs in the hierarchical level that precedes the respective additional hierarchical level;

initiating a population of two or more sample neural network architectures based on the data structure defining the hierarchical set of graphs, wherein each respective sample neural network architecture in the population is initiated by modifying one or more of the operations performed by the edges of the hierarchical set of graphs;

generating sample neural networks having the sample neural network architectures in the population;

training the sample neural networks;

evaluating the sample neural networks by determining a fitness value for each of the sample neural networks; and selecting one or more of the sample neural network architectures in the population according to the determined fitness values to determine a neural network architecture.

\* \* \* \* \*